(12) United States Patent
Tian et al.

(10) Patent No.: US 11,709,065 B2
(45) Date of Patent: Jul. 25, 2023

(54) INFORMATION PROVIDING DEVICE, INFORMATION PROVIDING METHOD, AND STORAGE MEDIUM

(71) Applicant: HONDA MOTOR CO., LTD., Tokyo (JP)

(72) Inventors: Lei Tian, Wako (JP); Yuya Ito, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 228 days.

(21) Appl. No.: 17/120,310

(22) Filed: Dec. 14, 2020

(65) Prior Publication Data

US 2021/0190528 A1 Jun. 24, 2021

(30) Foreign Application Priority Data

Dec. 18, 2019 (JP) .................................. 2019-228627

(51) Int. Cl.
*G01C 21/36* (2006.01)
*B60W 50/10* (2012.01)
(Continued)

(52) U.S. Cl.
CPC ......... *G01C 21/3608* (2013.01); *B60W 50/10* (2013.01); *G01C 21/3476* (2013.01);
(Continued)

(58) Field of Classification Search
CPC .... H04W 4/48; G06F 16/335; G06F 16/9537; G06F 16/3343; G06F 16/3329;
(Continued)

(56) References Cited

U.S. PATENT DOCUMENTS

2019/0392107 A1* 12/2019 Ricci ........................ G06F 21/31
2020/0124437 A1* 4/2020 Miyake .............. G01C 21/3644
(Continued)

FOREIGN PATENT DOCUMENTS

JP 2003-058672 2/2003
JP 2008-015787 1/2008
(Continued)

OTHER PUBLICATIONS

Japanese Office Action for Japanese Patent Application No. 2019-228627 dated Nov. 1, 2022.
(Continued)

*Primary Examiner* — Peter D Nolan
*Assistant Examiner* — Wae L Louie
(74) *Attorney, Agent, or Firm* — Amin, Turocy & Watson, LLP

(57) ABSTRACT

An information providing device includes an acquirer configured to acquire one or more pieces of orientation information indicating orientations of one or more users, a determiner configured to determine priority item information, which is item information to be preferentially provided, based on reference information in which a specific point and item information for each item of the specific point are associated with each other, and the one or more pieces of orientation information acquired by the acquirer, and a provider configured to allow an information output device associated with at least a part of the one or more users to output the priority item information.

11 Claims, 13 Drawing Sheets

(51) Int. Cl.
*G01C 21/34* (2006.01)
*H04W 4/48* (2018.01)
(52) U.S. Cl.
CPC .......... *H04W 4/48* (2018.02); *B60W 2540/01* (2020.02); *B60W 2540/049* (2020.02); *B60W 2540/227* (2020.02)
(58) Field of Classification Search
CPC ....... B60W 2540/01; B60W 2540/049; B60W 2540/227
See application file for complete search history.

(56) References Cited

U.S. PATENT DOCUMENTS

| 2020/0151477 A1* | 5/2020 | Onaka | G10L 15/22 |
| 2021/0114616 A1* | 4/2021 | Altman | H04W 8/205 |
| 2021/0190528 A1* | 6/2021 | Tian | H04W 4/48 |

FOREIGN PATENT DOCUMENTS

| JP | 2009-115594 | 5/2009 |
| JP | 2010-237134 | 10/2010 |
| JP | 2012-146068 | 8/2012 |
| JP | 2017-058765 | 3/2017 |

OTHER PUBLICATIONS

Ogawa, "Personalized Information Delivery Platform "TPOCAST"", 54, 7, NEC Technical Journal, Japan, NEC Corporation, Jul. 25, 2001, 54, pp. 96 to 99.

* cited by examiner

| ITEM \ USER | 001 | 002 | 003 |
|---|---|---|---|
| PRICE | HIGH | LOW | MEDIUM |
| ATMOSPHERE | MEDIUM | HIGH | LOW |
| DISTANCE | LOW | MEDIUM | HIGH |

FOR EACH POI

| STORE A | |
|---|---|
| PRICE | IF001 |
| ATMOSPHERE | IF002 |
| LOCATION | IF003 |
| ⋮ | ⋮ |

FIG. 6

| | | USER CORRESPONDING TO ORIENTATION INFORMATION | ITEM INFORMATION | DESTINATION |
|---|---|---|---|---|
| FIRST PATTERN | A | FIRST USER | FIRST ITEM INFORMATION | FIRST USER |
| | B | FIRST USER | FIRST ITEM INFORMATION | FIRST USER |
| | | SECOND USER | SECOND ITEM INFORMATION | SECOND USER |
| SECOND PATTERN | C | FIRST USER | FIRST ITEM INFORMATION | SECOND USER |
| | D | FIRST USER | FIRST ITEM INFORMATION | FIRST USER |
| | | | | SECOND USER |

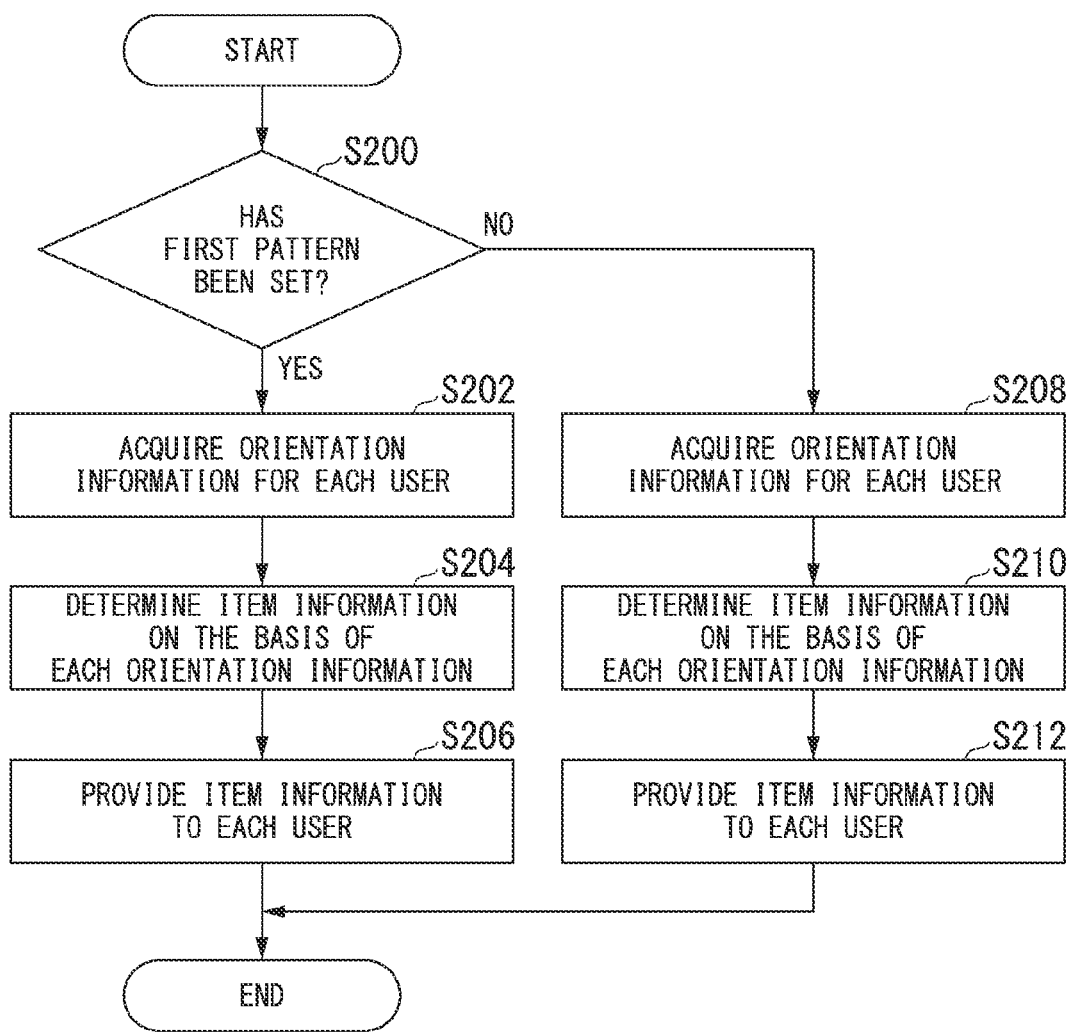

260B        EACH TRANSPORTATION MEANS or FOR EACH AREA

| USER | 001 |
|---|---|
| PRICE | LOW |
| ATMOSPHERE | MEDIUM |
| DISTANCE | LOW |
| ATTRACTION | HIGH |
| GOODS | HIGH |

AAA SHRINE

ATTRACTION
............
............

GOODS
AMULET OF AAA SHRINE

INFORMATION PROVIDING DEVICE, INFORMATION PROVIDING METHOD, AND STORAGE MEDIUM

Priority is claimed on Japanese Patent Application No. 2019-228627, filed Dec. 18, 2019, the content of which is incorporated herein by reference.

BACKGROUND

Field of the Invention

The present invention relates to an information providing device, an information providing method, and a storage medium.

Description of Related Art

In the related art, a device that automatically detects and presents destination categories desired by an occupant on the basis of conversations or monologues of the occupant has been disclosed (for example, see Japanese Unexamined Patent Application, First Publication No. 2009-115594). The device determines destination category candidates on the basis of the details of attributes of words acquired by a speech recognition means, and presents the destination candidates on the basis of the determined destination category candidate.

SUMMARY

However, the aforementioned device may not be able to provide information useful for users.

An aspect of the present invention is to provide an information providing device, an information providing method, and a storage medium, by which it is possible to provide information useful for users.

An information providing device, an information providing method, and a storage medium according to the invention employ the following configurations.

(1): An information providing device according to an aspect of the invention includes: an acquirer configured to acquire one or more pieces of orientation information indicating orientations of one or more users; a determiner configured to determine priority item information, which is item information to be preferentially provided, based on reference information in which a specific point and item information for each item of the specific point are associated with each other, and the one or more pieces of orientation information acquired by the acquirer; and a provider configured to allow an information output device associated with at least a part of the one or more users to output the priority item information.

(2): In the aspect of the aforementioned (1), when the determiner determines first priority item information on the specific point based on first orientation information acquired by the acquirer and indicating an orientation of a first user and determines second priority item information on the specific point based on second orientation information acquired by the acquirer and indicating an orientation of a second user, the provider is configured to allow an information output device associated with the first user to output the first priority item information and allow an information output device associated with the second user to output the second priority item information.

(3): In the aspect of the aforementioned (2), the determiner is configured to determine a plurality of users, who are in a relationship in which a common destination has been determined, as the first user and the second user.

(4): In the aspect of any one of the aforementioned (1) to (3), the acquirer is configured to acquire an evaluation of a predetermined user for the priority item information, and the provider is configured to provide the evaluation of the predetermined user to the user different from the user who has performed the evaluation.

(5): In the aspect of the aforementioned (4), the user and the different user are occupants of a same vehicle, and the different user is a driver of the vehicle.

(6): In the aspect of the aforementioned (1) to (5), the determiner is configured to switch between a first mode and a second mode based on an instruction of the user to determine the priority item information, the first mode is a mode in which the priority item information to be preferentially provided to a third user and a fourth user is determined based on orientation information acquired by the acquirer and indicating an orientation of the third user, and the second mode is a mode in which the priority item information to be preferentially provided to the third user is determined based on the orientation information acquired by the acquirer and indicating the orientation of the third user, and the priority item information to be preferentially provided to the fourth user is determined based on orientation information acquired by the acquirer and indicating an orientation of the fourth user.

(7): In the aspect of the aforementioned (1) to (6), the determiner is configured to determine the priority item information to be preferentially provided to the user, based on orientation information acquired by the acquirer and indicating orientations of the users and a priority set for each user included in the plurality of users.

(8): In the aspect of the aforementioned (1) to (7), the acquirer is configured to acquire the orientation information according to position information indicating a position of the user, and the determiner is configured to determine the priority item information to be preferentially provided to the one or more users, based on the reference information and the orientation information acquired by the acquirer.

(9): In the aspect of the aforementioned (1) to (8), the acquirer is configured to acquire the orientation information according to transportation means information indicating a transportation means of the user, and the determiner is configured to determine the priority item information to be preferentially provided to the one or more users, based on the reference information and the orientation information acquired by the acquirer.

(10): An information providing method according to an aspect of the invention causes a computer to perform the steps of: acquiring one or more pieces of orientation information indicating an orientation of one or more users; determining priority item information, which is item information to be preferentially provided, based on reference information in which a specific point and item information for each item of the specific point are associated with each other, and the one or more pieces of orientation information acquired by the acquirer; and allowing an information output device associated with at least a part of the one or more users to output the priority item information.

(11): A program stored in a non-transitory computer-readable storage medium according to an aspect of the invention is a computer program to be executed by a computer to perform at least: a process of acquiring one or more pieces of orientation information indicating an orientation of one or more users; a process of determining priority item information, which is item information to be preferentially provided, based on reference information in which a specific point and item information for each item of the specific point are associated with each other, and the one or more pieces of orientation information acquired by the acquirer; and a process of allowing an information output device associated with at least a part of the one or more users to output the priority item information.

According to (1) to (11), by providing users with the item information based on the orientation information, so that it is possible to provide information useful for the users.

According to (4), users can acquire evaluation results of other users, so that it is possible to evaluate the good or bad of the specific point by referring to the evaluation results.

According to (6), the information providing device is configured to determine the priority item information by switching the modes, so that convenience for the user is improved.

According to (8) or (9), the priority item information is determined according to the position and state of the user, so that users can acquire more useful information.

BRIEF DESCRIPTION OF THE DRAWINGS

FIG. 4 is a diagram showing an example of the content of orientation information.

FIG. 5 is a diagram showing an example of the content of reference information.

FIG. 6 is a diagram showing an example of a pattern between information provided by an information processor and a destination.

FIG. 13 is a flowchart (part 2) showing an example of the flow of a process performed by the information processor.

FIG. 14 is a diagram (part 1) showing another example of the orientation information used by a determiner.

DETAILED DESCRIPTION

Hereinafter, embodiments of an information providing device, an information providing method, and a storage medium of the present invention will be described with reference to the drawings. As used throughout this disclosure, the singular forms "a," "an," and "the" include plural reference unless the context clearly dictates otherwise.

First Embodiment

Figure 1:
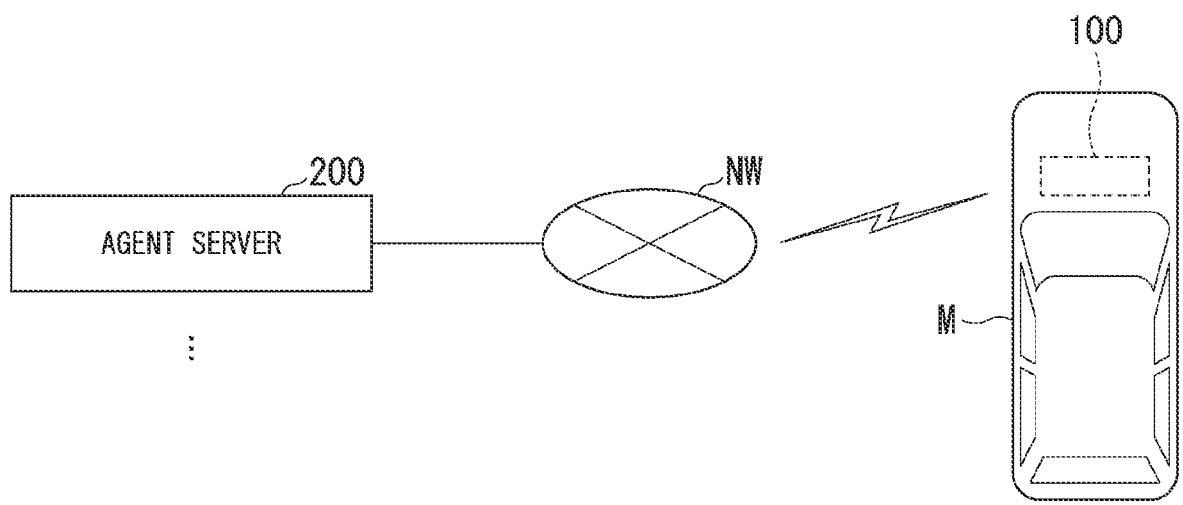
FIG. 1 is a configuration diagram of an information processing system.

FIG. 1 is a configuration diagram of an information processing system 1. The information processing system 1 has an agent function. The agent function is, for example, a function of providing various information based on a request (command) included in the speech of an occupant of a vehicle M or providing mediation for a network service while conversing with the occupant.

The agent function is performed by the integrated use of a natural language processing function (function of understanding the structure and meaning of text), a conversation management function, a network search function of searching for another device via a network or searching for a predetermined database owned by an own device, and the like, in addition to a voice recognition function of recognizing the voice of the occupant (function of converting voice into text). Some or all of these functions may be performed by artificial intelligence (AI) technology.

A part of the structure for performing these functions (particularly, the voice recognition function and the natural language processing function) may be provided in an in-vehicle communication device of the vehicle M or an agent server (external device) capable of communicating with a general-purpose communication device brought into the vehicle M. In the following description, it is assumed that a part of the structure is provided in an agent server and an agent device and the agent server implement an agent system in cooperation with each other. A service provider (service entity), which is made to virtually appear by the cooperation of the agent device and the agent server, is referred to as an agent.

The information processing system 1 includes, for example, an agent device 100 and one or more agent servers 200. The agent device 100 communicates with the agent server 200 via a network NW. The network NW includes, for example, some or all of the Internet, a cellular network, a Wi-Fi network, a wide area network (WAN), a local area network (LAN), a public line, a telephone line, a wireless base station, and the like.

The agent device 100 converses with the occupant of the vehicle M and transmits voice input by the occupant to the agent server 200. The agent device 100 provides an answer provided by the agent server 200 to the occupant in accordance with the aforementioned voice.

Vehicle

Figure 2:
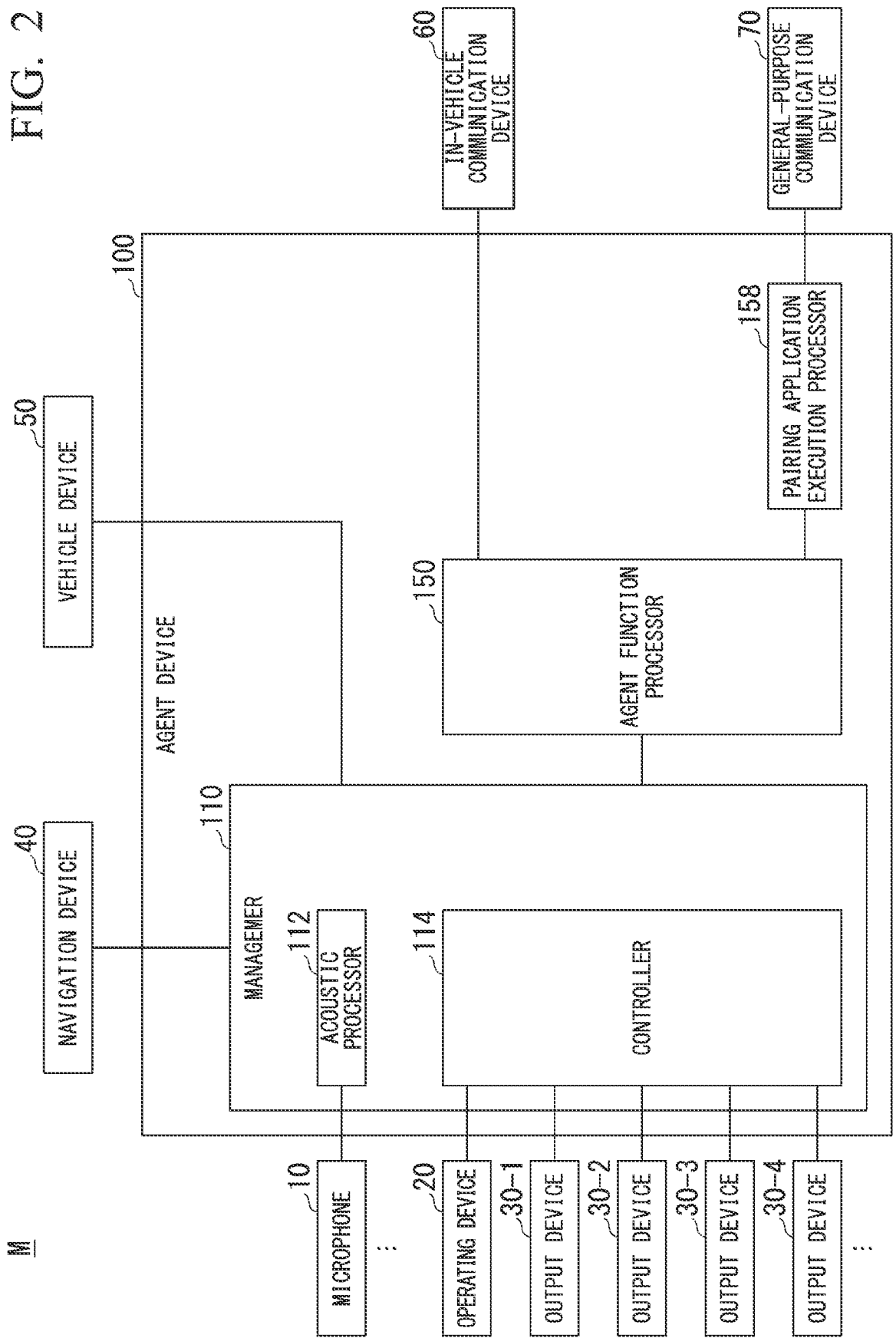
FIG. 2 is a diagram showing a functional configuration of an agent device and a functional configuration mounted on a vehicle M.

FIG. 2 is a diagram showing the functional configuration of the agent device 100 and the functional configuration mounted on the vehicle M. The vehicle M is equipped with, for example, one or more microphones 10, one or more operating devices 20, a plurality of output devices 30 (30-1 to 30-4 in the drawing), a navigation device 40, a vehicle device 50, an in-vehicle communication device 60, and the agent device 100. A general-purpose communication device 70 such as a smartphone may be brought into a vehicle interior and used in the vehicle interior. The general-purpose communication device 70 can communicate with the agent device 100 by controller area network (CAN) communication, wireless communication, and the like.

The microphone 10 is a voice collection device that collects voice generated in the vehicle interior. The operating device 20 is a device that accepts an input operation. The output devices 30 output images or voice. The output devices 30 are, for example, displays, speakers, and the like. The output devices 30-1 to 30-4 are, for example, an output device for a driver, an output device for an occupant seated on a passenger seat, an output device for an occupant seated on a rear seat behind the driver's seat, and an output device for an occupant seated on a rear seat behind the passenger seat. The operating device 20 or the output device 30 may have a structure having a function of accepting an input operation such as a touch panel and a function of outputting information.

The navigation device 40 includes a positioning device such as a navigation human machine interface (HMI) and a global positioning system (GPS), a storage device that stores map information, and a control device (navigation controller) that performs route search and the like. Some or all of the microphone 10, the operating device 20, and the output devices 30 may also be used in the navigation HMI. The navigation device 40 searches for a route (navigation route) for moving from the position of the vehicle M specified by the positioning device to the destination of the occupant, and outputs guide information using the navigation HMI such that the vehicle M can travel along the route. The route search function may also be provided in a navigation server accessible via the network NW.

The vehicle device 50 includes, for example, a driving force output device such as an engine and a travelling motor, door locking devices, door opening/closing devices, an air conditioner, power windows, a vehicle speed sensor, and the like. The in-vehicle communication device 60 communicates with the agent servers 200 via the network NW, for example.

Agent Device

The agent device 100 includes a manager 110, an agent function processor 150, and a pairing application execution processor 158. The manager 110 includes, for example, an acoustic processor 112 and a controller 114.

Each component of the agent device 100 is implemented by, for example, a hardware processor such as a central processing unit (CPU) that executes a program (software). Some or all of these components may be implemented by hardware (a circuit unit: including circuitry) such as a large scale integration (LSI), an application specific integrated circuit (ASIC), a field-programmable gate array (FPGA), and a graphics processing unit (GPU), or may be implemented by software and hardware in cooperation. The program may be stored in advance in a storage device (non-transitory storage medium) such as a hard disk drive (HDD) and a flash memory, or may be installed when a detachable storage medium (non-transitory storage medium) storing the program, such as a DVD and a CD-ROM, is mounted on a drive device.

The manager 110 functions when a program such as an operating system (OS) and middleware is executed.

The acoustic processor 112 of the manager 110 performs acoustic processing on input voice. When voice including a predetermined word is input to the microphone 10, the agent is started. The controller 114 controls the operating device 20 and the output devices 30. The controller 114 allows the output device 30 to display an image in accordance with an instruction from the agent function processor 150. The controller 114 generates, for example, an anthropomorphic agent image (hereinafter, referred to as an agent image) that communicates with the occupant in the vehicle interior, and allows the output device 30 to display the generated agent image by the control of the agent function processor 150. The agent image is, for example, an image able to be brought into a state of speaking to the occupant.

The controller 114 allows some or all of the speakers included in the output devices 30 to output voice in accordance with the instruction from the agent function processor 150. The controller 114 may also perform control for localizing an agent voice sound image at a position corresponding to a display position of the agent image, for example, by using one or more speakers. The position corresponding to the display position of the agent image is, for example, a position where the occupant is expected to feel that the agent voice of the agent image should be speaking. The localization of the sound image means that, for example, the spatial position of a sound source experienced by the occupant is determined by adjusting the loudness of voice transmitted to the left and right ears of the occupant.

The agent function processor 150 makes the agent appear in cooperation with the agent server 200, and provides a service including a voice response in accordance with the speech of the occupant of the vehicle M. The agent function processor 150 may communicate with the agent server 200 in cooperation with the general-purpose communication device 70 such as a smartphone via the pairing application execution processor 158.

The pairing application execution processor 158 performs pairing with the general-purpose communication device 70 by, for example, Bluetooth (registered trademark), and connects the agent function processor 150 and the general-purpose communication device 70. The agent function processor 150 may be connected to the general-purpose communication device 70 by wired communication using a universal serial bus (USB) and the like.

Agent Server

Figure 3:
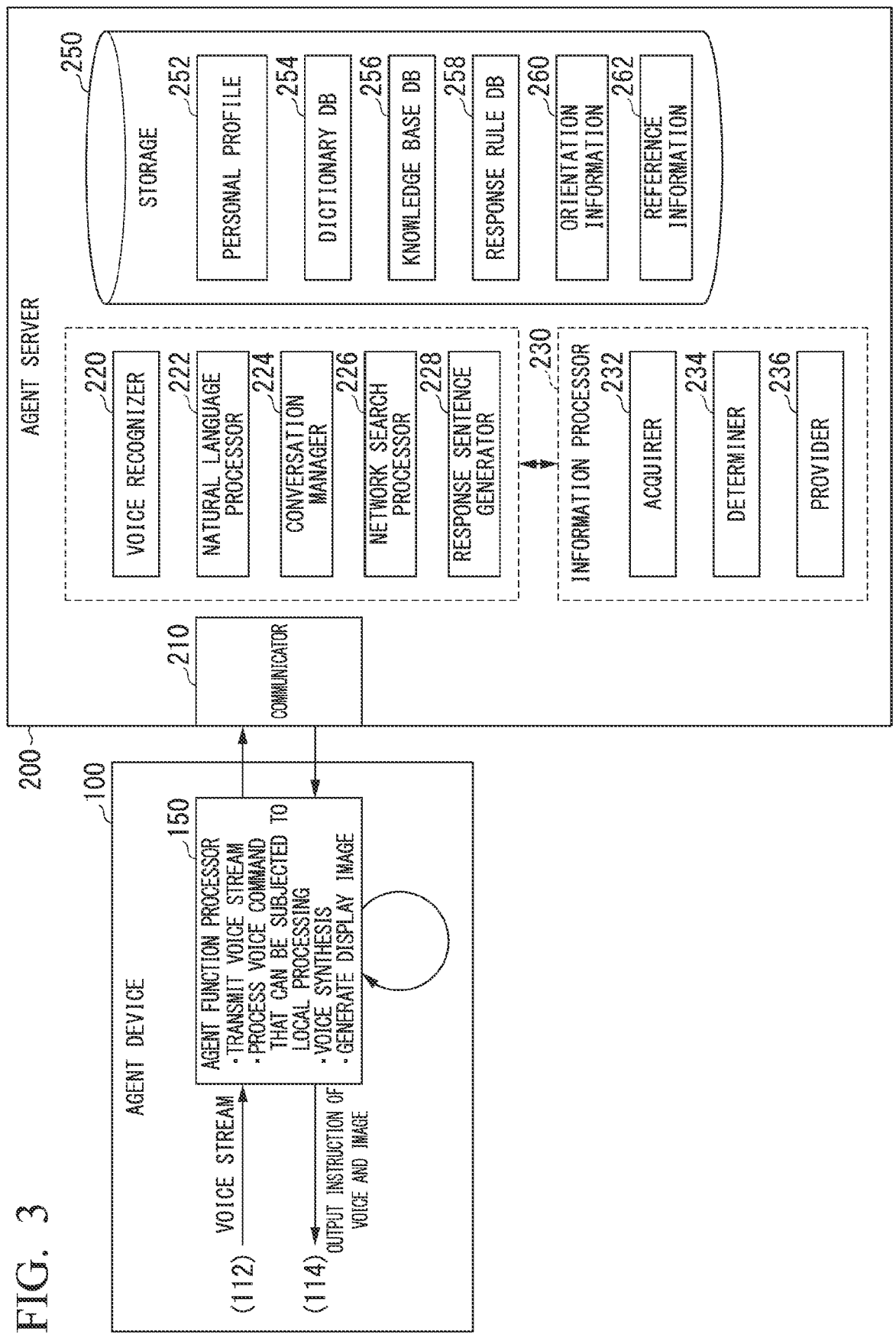
FIG. 3 is a diagram showing a configuration of an agent server and a part of the configuration of the agent device.

FIG. 3 is a diagram showing the configuration of the agent server 200 and a part of the configuration of the agent device 100. Hereinafter, operations of the agent function processor 150 and the like together with the configuration of the agent server 200 will be described. A part of the functional configuration of the agent server 200 may also be included in the agent device 100 or another device.

The agent server 200 includes a communicator 210. The communicator 210 is, for example, a network interface such as a network interface card (NIC). Moreover, the agent server 200 includes, for example, a voice recognizer 220, a natural language processor 222, a conversation manager 224, a network search processor 226, a response sentence generator 228, and an information processor 230. These components are implemented by, for example, a hardware processor such as a central processing unit (CPU) that executes a program (software). Some or all of these components may be implemented by hardware (a circuit unit: including circuitry) such as an LSI, an ASIC, a FPGA, and a GPU, or may be implemented by software and hardware in cooperation. The program may be stored in advance in a storage device (non-transitory storage medium) such as a HDD and a flash memory, or may be installed when a detachable storage medium (non-transitory storage medium) storing the program, such as a DVD and a CD-ROM, is mounted on a drive device.

The agent server 200 includes a storage 250. The storage 250 is implemented by the aforementioned various storage devices. The storage 250 stores data such as a personal profile 252, a dictionary DB (database) 254, a knowledge base DB 256, a response rule DB 258, orientation information 260 to be described below, and reference information 262 to be described below, and programs.

The agent function processor 150 of the agent device 100 transmits a voice stream, or a voice stream subjected to a process such as compression and encoding to the agent server 200. When recognizing a voice command that can be subjected to local processing (processing that does not go through the agent server 200), the agent function processor 150 may perform a process requested by the voice command. The voice command that can be subjected to local processing is a voice command that can be answered by referring to information (not showed) stored in the storage device included in the agent device 100, or a voice command for controlling the vehicle device 50 (for example, a command and the like for turning on an air conditioner). Accordingly, the agent function processor 150 may also have a part of the functions of the agent server 200.

When the voice stream is acquired, the agent device 100 outputs character information converted into text by the voice recognition of the voice recognizer 220, and the natural language processor 222 interprets the meaning of the character information while referring to the dictionary DB 254. The dictionary DB 254 is a DB in which abstract semantic information is correlated with the character information. The dictionary DB 254 may include information on a list of synonyms. The process of the voice recognizer 220 and the process of the natural language processor 222 are processes in which stages thereof are not obviously separated, and may be performed by interacting with each other such as correction of the recognition result by the voice recognizer 220 in response to the processing result of the natural language processor 222.

For example, when the meanings such as "today's weather?" and "how's the weather?" are recognized as the recognition result, the natural language processor 222 generates a command replaced with standard character information "today's weather". In this way, even when there is a character fluctuation in the voice of a request, it is possible to facilitate a conversation according to the request. The natural language processor 222 may recognize the meaning of character information by using an artificial intelligence technology including machine learning and the like, or generate a command based on the recognition result.

On the basis of the processing result (command) of the natural language processor 222, the conversation manager 224 determines the content of speech to the occupant of the vehicle M while referring to the personal profile 252, the knowledge base DB 256, and the response rule DB 258. The personal profile 252 includes occupant's individual information, preferences, history of past conversations, and the like stored for each occupant. The knowledge base DB 256 is information that defines the relation between things. The response rule DB 258 is information that defines operations (content and the like of answer and device control) to be performed by the agent in response to the command.

The conversation manager 224 may specify the occupant by collating with the personal profile 252 by means of feature information obtained by the voice stream. In such a case, in the personal profile 252, for example, personal information is correlated with voice feature information. The voice feature information is, for example, information on features of way of speaking such as voice pitch, intonation, and rhythm (voice pitch pattern), and feature amounts based on Mel frequency cepstrum coefficients and the like. The voice feature information is, for example, information obtained by allowing the occupant to utter a predetermined word, sentence and the like at the time of initial registration and recognizing the uttered voice. When the command requests information that can be searched via the network NW, the conversation manager 224 allows the network search processor 226 to perform a search.

The network search processor 226 accesses various web servers (not showed) via the network NW to acquire desired information. The "information that can be searched via the network NW" is, for example, a restaurant around the vehicle M, an evaluation result by a general user of the restaurant, or a weather forecast according to the position of the vehicle M on that day.

The response sentence generator 228 generates a response sentence such that the content of the speech determined by the conversation manager 224 is transmitted to the occupant of the vehicle M, and transmits the generated response sentence to the agent device 100. The response sentence generator 228 may call the name of the occupant or generate a response sentence in a way of speaking that resembles the way the occupant speaks.

Upon acquiring the response sentence, the agent function processor 150 instructs the controller 114 to perform voice synthesis and output voice. The agent function processor 150 instructs the controller 114 to display the agent image in accordance with the voice output. By so doing, an agent function, in which the virtually appearing agent responds to the occupant of the vehicle M, is implemented.

Information Processor

For example, when providing information on a specific point such as a predetermined point of interest (POI) to a user, the information processor 230 determines item information (for example, priority item information of a price, an atmosphere, a position, and the like), which is to be preferentially provided to the user, on the basis of the orientation of the user. More specifically, when providing information on a predetermined specific point to a plurality of users, the information processor 230 determines item information, which is to be preferentially provided to the users, on the basis of the orientation of the users or the orientation of each user.

The information processor 230 includes, for example, an acquirer 232, a determiner 234, and a provider 236. The acquirer 232 acquires orientation information indicating the orientation of one or more users. The users are, for example, users (occupants) who are in a vehicle or predetermined users. The predetermined users are a predetermined user (for example, a driver) among the users who are in a vehicle or a user who is not in the vehicle and will join the occupants later.

FIG. 4 is a diagram showing an example of the content of the orientation information 260. The orientation information 260 is information indicating the orientation of a user. The information indicating the orientation is information indicating the way of thinking of the user, information indicating preferences, information indicating matters on which the user places importance, and the like, in relation to the provision of information such as POI information. The orientation information 260 is, for example, information in which predetermined item information and the degree of importance of the item information to a user are correlated with each other. A POI is, for example, predetermined facilities or places such as stores, parks, buildings, plazas, and tourist spots. The predetermined item information includes, for example, a price, an atmosphere, a distance from a predetermined position (for example, a current location), and the like. The predetermined item information may include arbitrary items such as an external appearance, an internal appearance, and public evaluations, in addition to the above. In the example of FIG. 4, user 001 is a user who places importance on price but does not place importance on distance.

The determiner 234 determines item information (priority item information), which is to be preferentially provided, on the basis of the reference information 262 in which a specific point and item information for each item of the specific point are associated with each other, and one or more pieces of orientation information 260 acquired by the acquirer 232.

FIG. 5 is a diagram showing an example of the content of the reference information 262. The reference information 262 is information in which a specific point and the item information for each item of the specific point are correlated (associated) with each other. The item information is information on the price of services and goods provided by the specific point, the atmosphere of the specific point, the location of the specific point, and the like. The item information may include arbitrary information such as external appearance, internal appearance, public evaluations, and the state of a parking lot, in addition to the above. The determiner 234 determines that, for example, the price information included in the reference information 262 is to be provided to a user who places importance on the price in the orientation information 260.

The provider 236 allows an output device associated with at least a part of one or more users to output the item information (priority item information) determined by the determiner 234.

In the user information (not showed), the predetermined users and the output devices are associated with each other. For example, the output device 30-1 is associated with a user who is seated on the driver's seat and the output device 30-2 is associated with a user who is seated on the passenger seat. In the user information, display areas of the output devices may be associated with the users. In the user information, for example, the left half of the display area may be associated with a user who is seated on the passenger seat and the right half of the display area may be associated with a user who is seated on the driver's seat. In such a case, for each display area, item information for the user associated with the display area is displayed.

The user who is seated on the driver's seat and the user who is seated on the passenger seat may be identified as follows. For example, as described above, the conversation manager 224 may identify the occupant by verification with respect to the personal profile 252 by using the feature information obtained from the voice stream. The agent device 100 and the agent server 200 may identify the position of the user's speech and identify that the identified occupant is present at the identified position. The seating position of the user may be identified based on operating the operating device 20 by the user. The occupant may be identified on the basis of an image captured by a camera (not showed) in the vehicle interior.

FIG. 6 is a diagram showing an example of a pattern between information provided by the information processor 230 and a destination. The information processor 230 provides information according to a first pattern or a second pattern. The first pattern includes pattern A or pattern B. The second pattern includes pattern C or pattern D.

In the pattern A and the pattern B, a user associated with orientation information used for determining item information is the same as a user associated with a destination.

Pattern A: The information processor 230 determines first item information on the basis of orientation information of a first user, and provides the determined first item information to an output device associated with the first user. Hereinafter, "providing the item information to the output device associated with the user" may be simply referred to as "providing the item information to the user".

Pattern B: The information processor 230 determines the first item information on the basis of the orientation information of the first user, provides the determined first item information to the first user, determines second item information on the basis of orientation information of a second user, and provides the determined second item information to the second user. That is, when the determiner 234 determines first priority item information on a specific point on the basis of first orientation information indicating the orientation of the first user and determines second priority item information on the same specific point on the basis of second orientation information indicating the orientation of the second user, the provider 236 allows an information output device associated with the first user to output the first priority item information and allows an information output device associated with the second user to output the second priority item information.

In the pattern C and the pattern D, the user associated with orientation information used for determining the item information is different from the user associated with a destination.

Pattern C: The information processor 230 determines the first item information on the basis of the orientation information of the first user, and provides the determined first item information to the second user. The provider 236 allows the information output device associated with the second user different from the first user to output the first priority item information.

Pattern D: The information processor 230 determines the first item information on the basis of the orientation information of the first user, and provides the determined first item information to the first user and the second user. The provider 236 also allows the information output device associated with the first user to output the first priority item information.

For example, the process of the aforementioned pattern B or pattern D is performed when the agent server 200 provides a user included in a group with information on a predetermined specific point (for example, when providing information to users at the same time). The group includes a plurality of occupants who are in the same vehicle or users designated by the user. When the provider 236 provides the item information to a specific user, the item information is provided to a terminal device associated with the specific user.

The determiner 234 sets a plurality of users (for example, the first user and the second user), who are in a relationship in which a common destination has been determined, as targets for a process of determining the item information (priority item information) to be preferentially provided. The "plurality of users who are in a relationship in which a common destination has been determined" are, for example, a plurality of users who are in a relationship in which they have board the same vehicle, a plurality of users who are in a relationship in which they are accompanying each other, a plurality of users who are at different points but are in a relationship in which they have promised to meet in the future, and the like. The plurality of users who are in a relationship in which they are accompanying each other may be a plurality of users who are walking or a plurality of users who are staying at a predetermined place. In the first embodiment, it is assumed that the plurality of users are in the same vehicle. The users, who are in the same vehicle, are users included in the aforementioned user information, for example. A process for the plurality of users who are in a relationship in which they are accompanying each other or the plurality of users who are at different points but are in a relationship in which they have promised to meet in the future will be described in a second embodiment.

SPECIFIC EXAMPLE OF FIRST PATTERN

Figure 7:
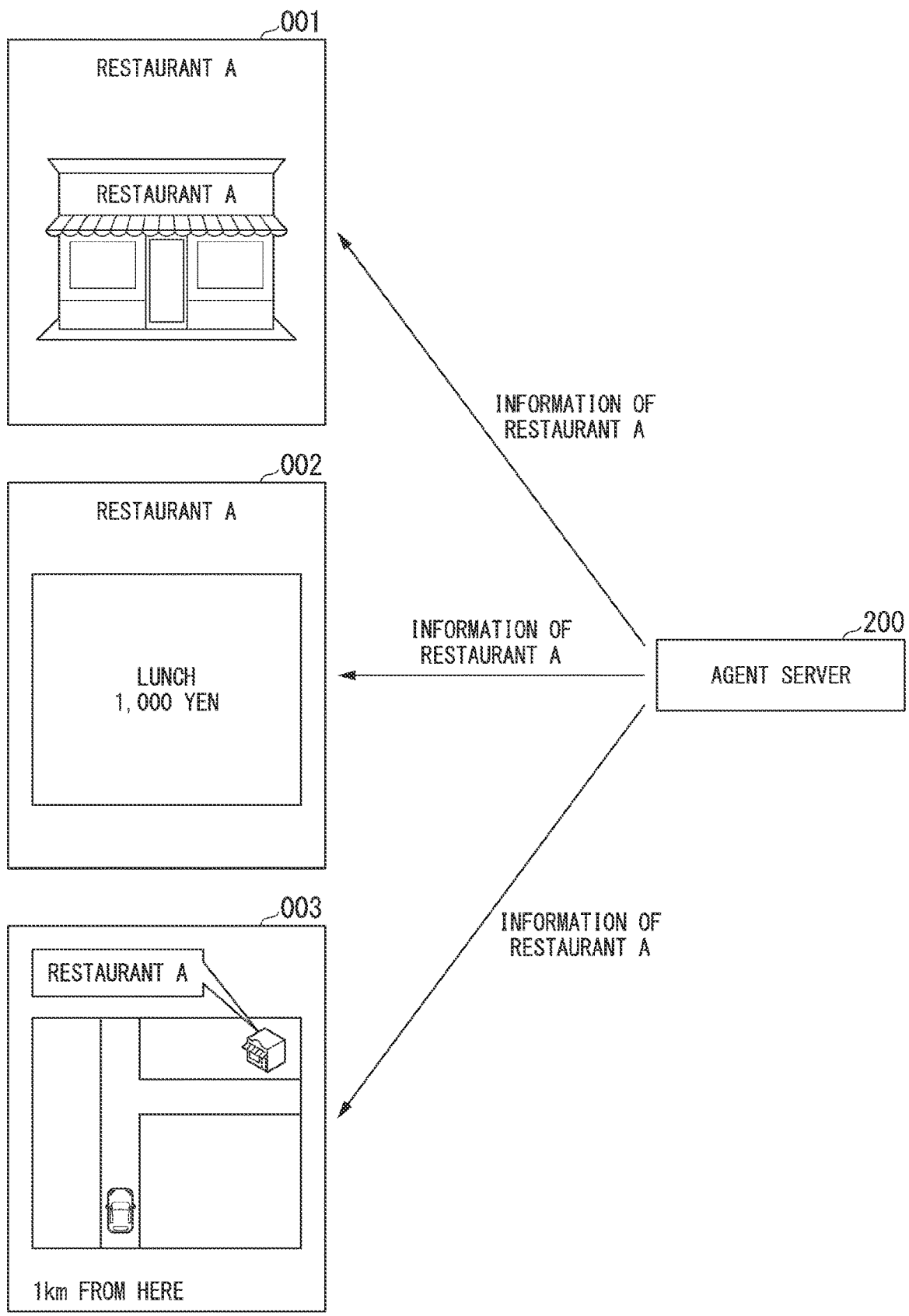
FIG. 7 is a diagram showing an example of the content of item information preferentially provided to each user in a first pattern.

FIG. 7 is a diagram showing an example of the content of item information preferentially provided to each user in the first pattern. FIG. 7 shows a situation in which item information on restaurant A is provided to each user. The orientation information 260 includes information indicating that user 001 places importance on an atmosphere of the specific point, user 002 places importance on a price of the specific point, and user 003 places importance on a distance to the specific point.

In the above case, for example, the information processor 230 provides item information indicating the atmosphere (for example, external appearance) of the specific point to the user 001, provides item information indicating the price (for example, the price of a menu item) of the specific point to the user 002, and provides item information indicating the position (for example, the distance from the current location) of the specific point to the user 003.

In this way, the information processor 230 can provide item information that matches the orientation of the user. As a consequence, the user can acquire useful information.

Figure 8:
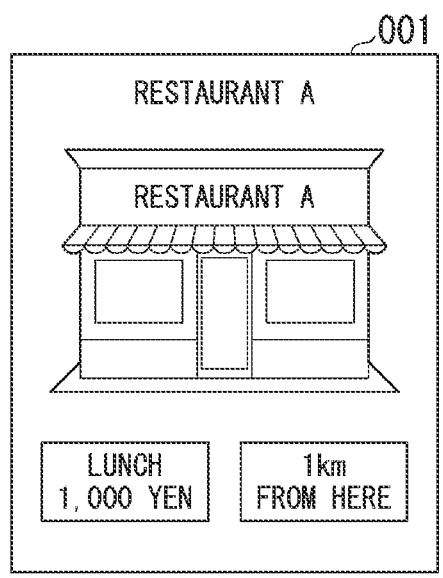
FIG. 8 is a diagram showing an example of information in which item information on which another user places importance is included information provided to a user.

In the example showed in FIG. 7, it has been described that only item information on which a user places importance is provided to the user; however, item information on which another user places importance or other item information may be included in information provided to the user. FIG. 8 is a diagram showing an example of information in which item information on which another user places importance is included information provided to a user. In the example showed in FIG. 8, the item information of the price and the position of the specific point is included in the item information provided to the user 001. The information of the atmosphere of the specific point is provided to the user in a state in which it has a higher priority than the item information of the price and the position of the specific point, which is other item information (in a state in which it is more visible than the other item information).

Figure 9:
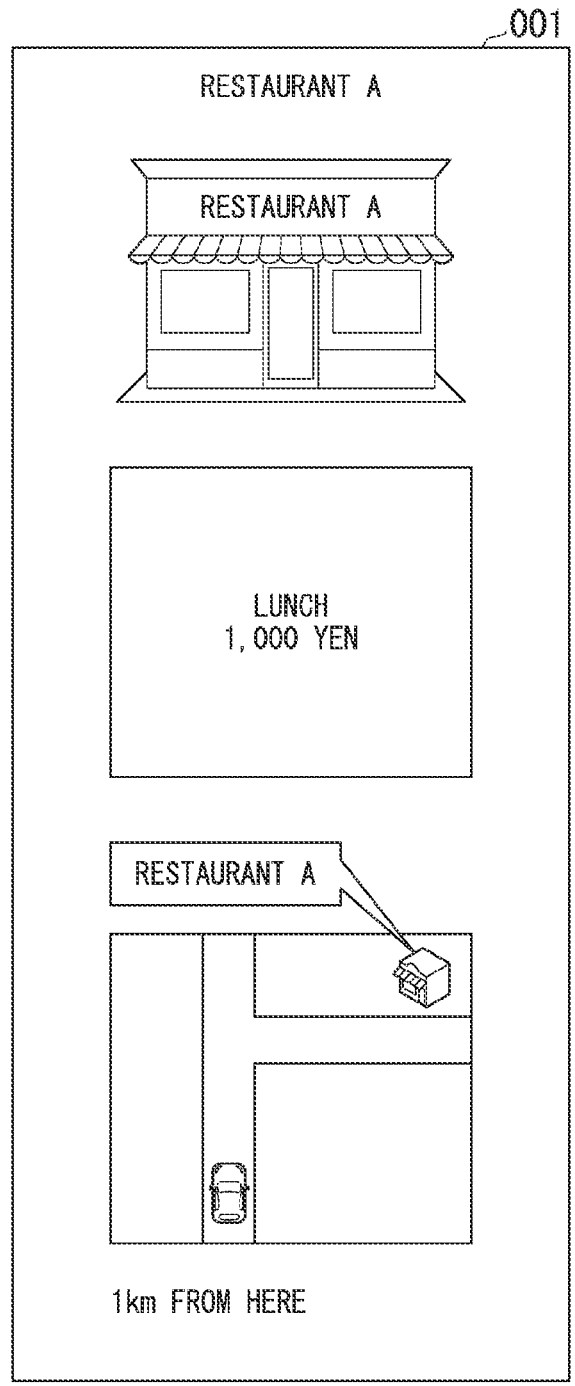
FIG. 9 is a diagram showing an example of an image in which item information of the atmosphere of a specific point is arranged in a high-priority way.

The high-priority state may be indicated by an area occupied by the information being large as showed in FIG. 8, or indicated by the position of the area occupied by the information being placed at a position (upper position) that is move visible than the position of an area occupied by low-priority information as showed in FIG. 9. FIG. 9 is a diagram showing an example of an image in which the item information of the atmosphere of the specific point is arranged in the high-priority way. The high-priority way may indicate that the timing at which the item information is displayed is before the timing at which other item information is displayed.

The information processor 230 may also provide each user with information having a degree of importance equal to or more than a predetermined degree in the orientation information 260 of each user. For example, in the orientation information 260, the information processor 230 may also provide each user with item information in which the degree of importance of each user is "medium" and "high".

SPECIFIC EXAMPLE OF SECOND PATTERN

Figure 10:
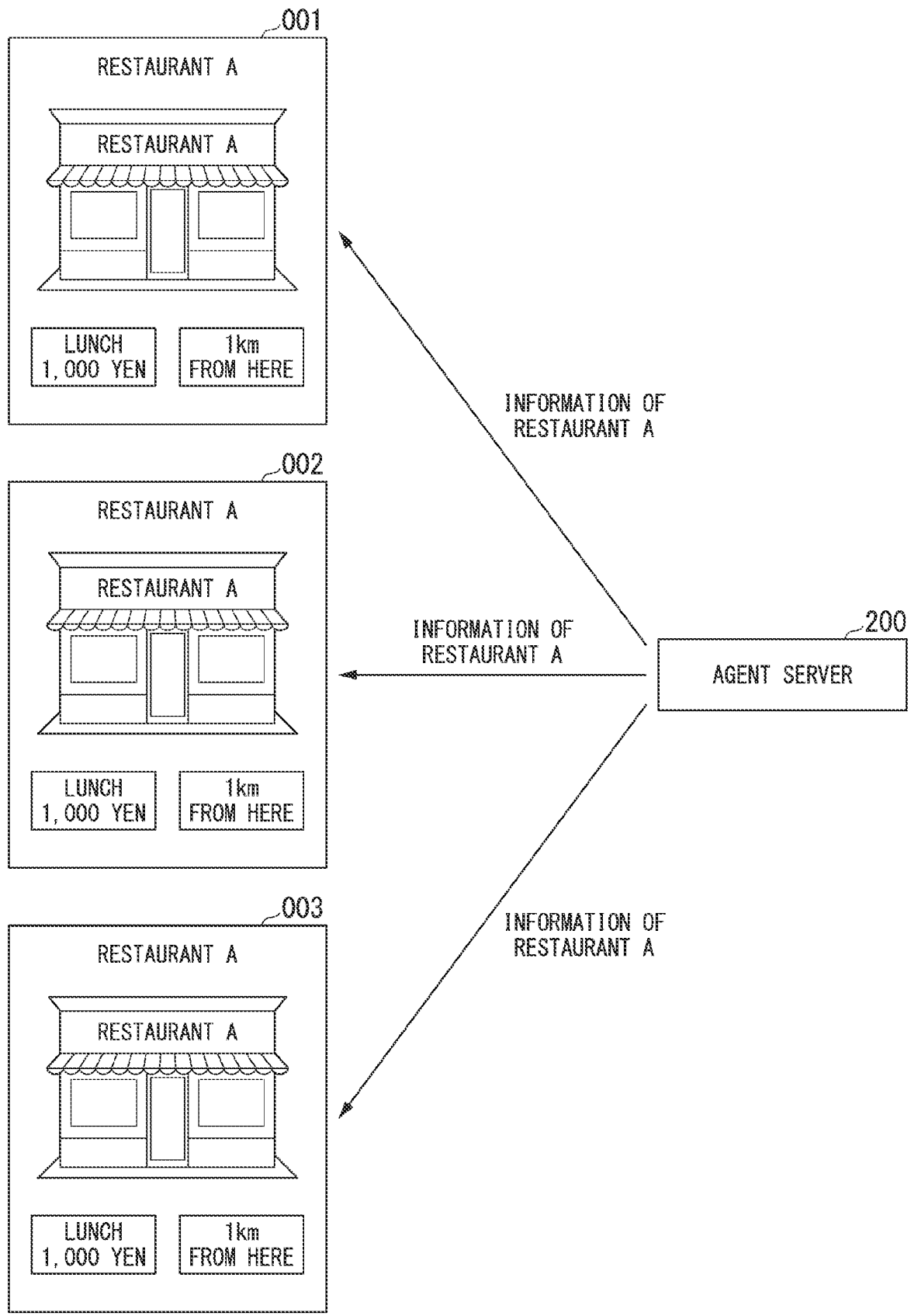
FIG. 10 is a diagram showing an example of the content of item information provided to each user in a second pattern.

FIG. 10 is a diagram showing an example of the content of item information provided to each user in the second pattern. FIG. 10 shows a situation in which the item information on restaurant A is provided to each user, as in FIG. 7 and the like. The orientation information 260 includes the information indicating that the user 001 places importance on the atmosphere of the specific point, the user 002 places importance on the price of the specific point, and the user 003 places importance on the distance to the specific point.

In the above case, for example, the information processor 230 provides the item information indicating the atmosphere of the specific point to the user 001 to the user 003 in a high-priority way as showed in FIG. 10. In the second pattern, the information processor 230 may provide the user 001 to the user 003 with the item information in a way that an area occupied by the item information of the atmosphere in the image has a high priority.

In this way, the information processor 230 can provide item information that matches the orientation of a predetermined user (for example, "high-priority user"). As a consequence, the user can acquire useful information. For example, the predetermined user can provide other users with item information that matches his/her orientation, thereby whether the specific point is good or bad being able to be conveyed to the other users. Furthermore, users included in other group can efficiently determine whether to go to the specific point.

Priority

The "high-priority user" is a user (driver) who is seated on the driver's seat of the vehicle, a user set in advance in the group (or occupants), and the like. As showed in FIG. 10, on the basis of the orientation information 260 indicating the orientation of a plurality of users and a priority set for each user included in the plurality of users, the determiner 234 determines item information to be preferentially provided to the users. The priority set for the user may vary for each vehicle or user position. For example, in area A, the priority of the user 001 may be set to be the highest, and in area B, the priority of the user 002 may be set to be the highest. This may be because, for example, the user 001 has knowledge about a specific point in the area A and the user 002 has knowledge about a specific point in the area B.

In this way, the item information based on the orientation of the high-priority user is preferentially provided to other users, so that the other users can obtain highly reliable information or the group can be efficiently made aware of whether the specific point is good or bad.

Provision of Evaluation

Figure 11:
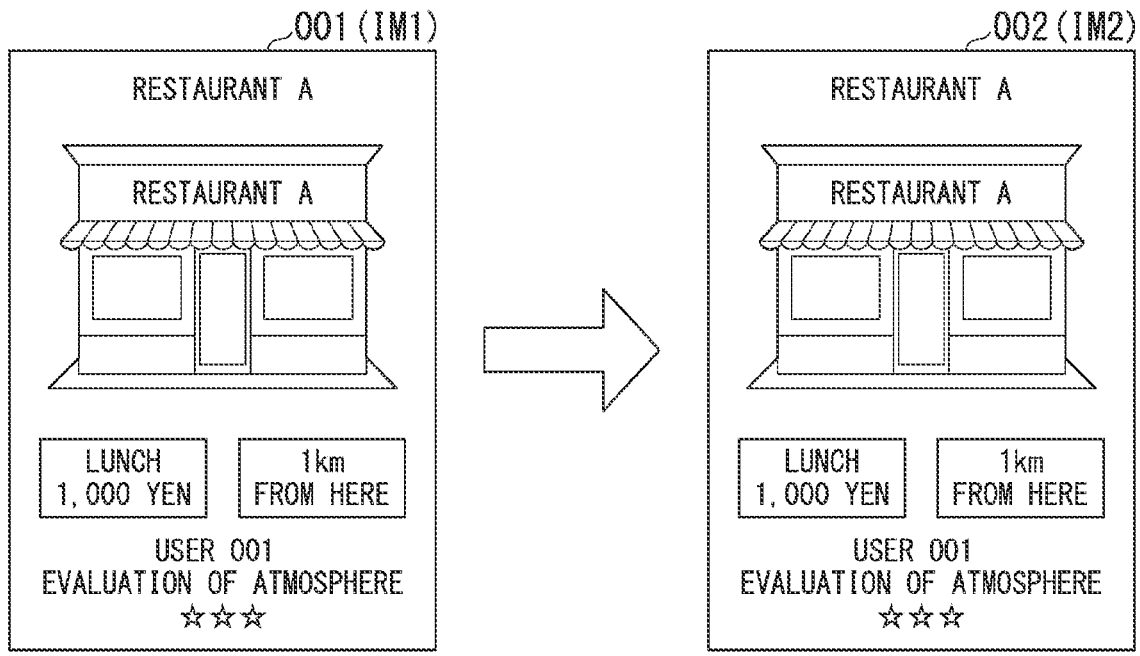
FIG. 11 is a diagram showing a process when an evaluation result is provided to a user.

The acquirer 232 may acquire the evaluation of the predetermined user for the item information, and the provider 236 may provide the evaluation of the predetermined user to a user different from the user who has performed the evaluation. FIG. 11 is a diagram showing a process when an evaluation result is provided to a user. For example, when the user 001 refers to an image IM1 including information indicating the atmosphere of a specific point, and operates the operating device 20, for example, to evaluate the specific point, the provider 236 provides other users with an image IM2 including information indicating an evaluation result regarding the item information input to the user 001. The aforementioned evaluation result may be an evaluation result of each item information or a comprehensive evaluation result for the specific point.

In this way, the user can easily refer to evaluation results of other users. That is, the user can acquire useful information.

In each of the aforementioned examples, it has been described that an image including the item information is provided; however, instead of this (or in addition to this), voice including the item information may be output. In such a case, the item information is provided to users in the high-priority way. For example, item information with a high priority may be output earlier than item information with a low priority.

Flowchart (Part 1)

Figure 12:
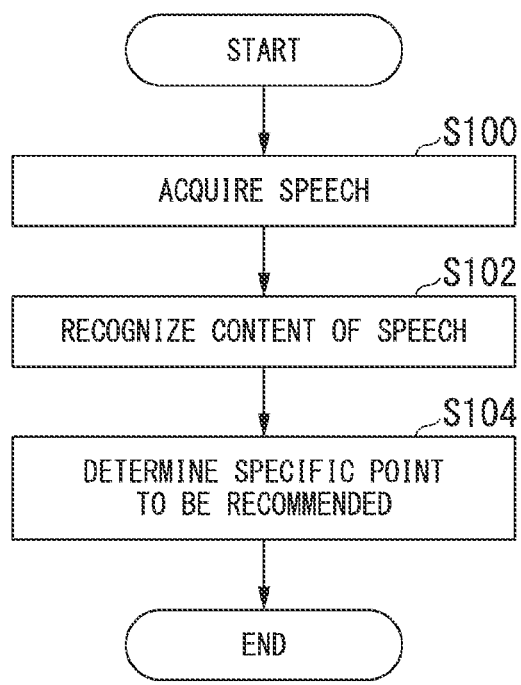
FIG. 12 is a flowchart (part 1) showing an example of the flow of a process performed by an agent server.

FIG. 12 is a flowchart (part 1) showing an example of the flow of the process performed by the agent server 200. First, the agent server 200 acquires the speech of the occupant from the agent device 100 (step S100) and recognizes the content of the acquired speech (step S102). Next, on the basis of the recognized content of the speech, the agent server 200 determines a specific point to be recommended (step S104). For example, when the occupant has said "Let's eat lunch somewhere", the agent server 200 specifies the specific point "restaurant A" on the basis of a predetermined algorithm, model, and the like. In this way, the process of the present flowchart ends. In this way, the specific point is determined.

The aforementioned method of determining the specific point is an example, and the occupant may specify the specific point or a specific point around a position where the user passes by may be determined as the specific point to be recommended.

Flowchart (Part 2)

FIG. 13 is a flowchart (part 2) showing an example of the flow of the process performed by the information processor 230. For example, whether the aforementioned first pattern is applied or the aforementioned second pattern is applied may be set by a user. For example, a process based on the set pattern is performed as follows.

First, the information processor 230 determines whether the first pattern has been set (step S200). When the first pattern has been set, the acquirer 232 acquires orientation information for each user (step S202). Next, the determiner 234 determines item information on the basis of each piece of the acquired orientation information (step S204). Next, the provider 236 provides the determined item information to each user (step S206). In this way, the item information is provided to the users as showed in FIG. 7 described above.

When the first pattern has not been set (when the second pattern has been set), the acquirer 232 acquires orientation information of a user (for example, a high-priority user) (step S208). Next, the determiner 234 determines item information on the basis of the acquired orientation information (step S210). Next, the provider 236 provides the determined item information to each user (step S212). In this way, the item information is provided to the users as showed in FIG. 10 described above.

For example, when the specific point is determined by the speech or intention of the user 001, the high-priority user may be set as the user 001. In such a case, for example, in step S210, the determiner 234 may determine that a part or all of the item information on which the user 001 places importance is to be provided to other users.

As described above, the information processor 230 determines item information, which is to be preferentially provided to the users, in accordance with the set pattern. As a consequence, convenience for the users is improved.

ANOTHER EXAMPLE 1 OF ORIENTATION INFORMATION

The determiner 234 may determine item information, which is provided to users, on the basis of the reference information 262 and orientation information according to position information acquired by the acquirer 232. The acquirer 232 acquires position information indicating the position of a user from a vehicle which the user has boarded or a terminal device held by the user.

The determiner 234 may determine item information, which is provided to users, on the basis of the reference information 262 and orientation information according to transportation means information acquired by the acquirer 232. The acquirer 232 acquires the transportation means information indicating the transportation means of a user from a vehicle which the user has boarded or a terminal device held by the user. For example, the user operates the operating device 20 of the vehicle or the terminal device held by the user and provides the transportation means to the agent server 200. The agent server 200 may also identify the transportation means on the basis of a displacement of the position information of the user. For example, when the position displacement per unit time is less than a predetermined degree, the agent server 200 may estimate that the user is moving on foot, and when the position displacement per unit time is equal to or more than the predetermined degree, the agent server 200 may estimate that the user is moving using a movable body (vehicle or bicycle).

FIG. 14 is a diagram (part 1) showing another example of the orientation information used by the determiner 234. Orientation information 260A is provided, for example, for each area or each transportation means. For example, in the orientation information 260A, the user 001 may be associated with the price in the area A and the atmosphere in the area B on which importance has been placed. The area A is, for example, a usual activity area of the user 001, and the area B is, for example, an activity area different from the usual activity area of the user 001 and is, for example, a tourist spot. For example, in the orientation information 260A, the user 001 may be associated with the price on which importance has been placed when using a movable body. For example, in the orientation information 260A, the user 001 may be associated with the distance to the specific point on which importance has been placed when moving on foot.

In this way, the information processor 230 can provide the user with useful item information according to the state of the user and the position of the user. As a consequence, the user can acquire more useful information.

ANOTHER EXAMPLE 2 OF ORIENTATION INFORMATION

Figures 15, 16:
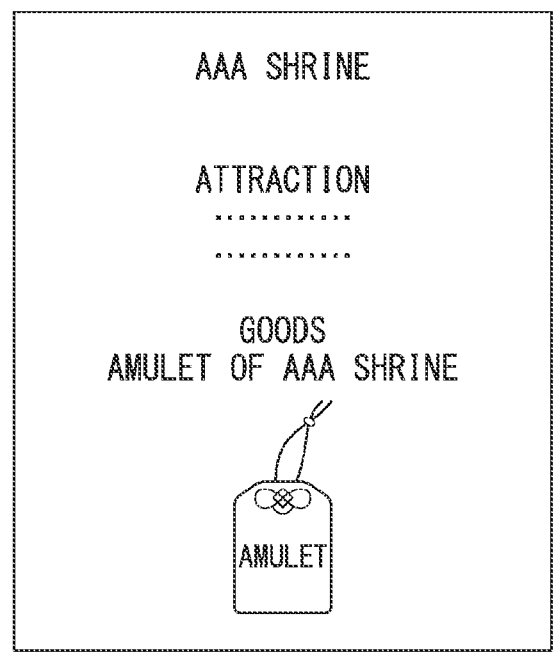
FIG. 15 is a diagram (part 2) showing another example of orientation information used by the determiner.
FIG. 16 is a diagram showing an example of the content of information on a specific point based on orientation information provided to a user.

FIG. 15 is a diagram (part 2) showing another example of the orientation information used by the determiner 234.

Orientation information 260B is provided, for example, for each area or each transportation means. For example, in the orientation information 260B, the content of item information differs for each area or each transportation means. For example, in the area A, the price, the atmosphere, and the distance are defined as item information, and in the area B, attractions, goods and the like are defined as item information, in addition to the price, the atmosphere, and the distance. The area A is, for example, an area different from the usual activity area of the user 001 or a tourist spot, and the area B is, for example, an activity area or a tourist spot different from the usual activity range of the user 001. For example, the attractions and goods are defined as the item information in the area B, and the degree of importance thereof is associated with the item information. Also, in the orientation information 260B showed in FIG. 15, the degree of importance associated with the item information may differ for each area or each transportation means.

FIG. 16 is a diagram showing an example of the content of information on a specific point based on the orientation information 260B provided to a user. For example, when information on an AAA shrine is provided to the user on the basis of the orientation information 260B of FIG. 15, for example, information on attractions of the AAA shrine and goods unique to the AAA shrine (for example, special products and souvenirs) is preferentially provided to the user.

In this way, the information processor 230 can provide the user with useful item information according to the state of the user and the position of the user. As a consequence, the user can acquire more useful information.

According to the first embodiment described above, the information processor 230 can determine item information, which is to be preferentially provided to one or more users, on the basis of the reference information 262 and the orientation information, and allow an information output device associated with the one or more users to output the determined item information, thereby providing information useful for the users.

Second Embodiment

Hereinafter, the second embodiment will be described. In the first embodiment, the above description has been given on the assumption that the agent server 200 provides information to the output device 30 of the vehicle M. However, in the second embodiment, the agent server provides information to the output devices of terminal devices. Hereinafter, the second embodiment will be described.

Figure 17:
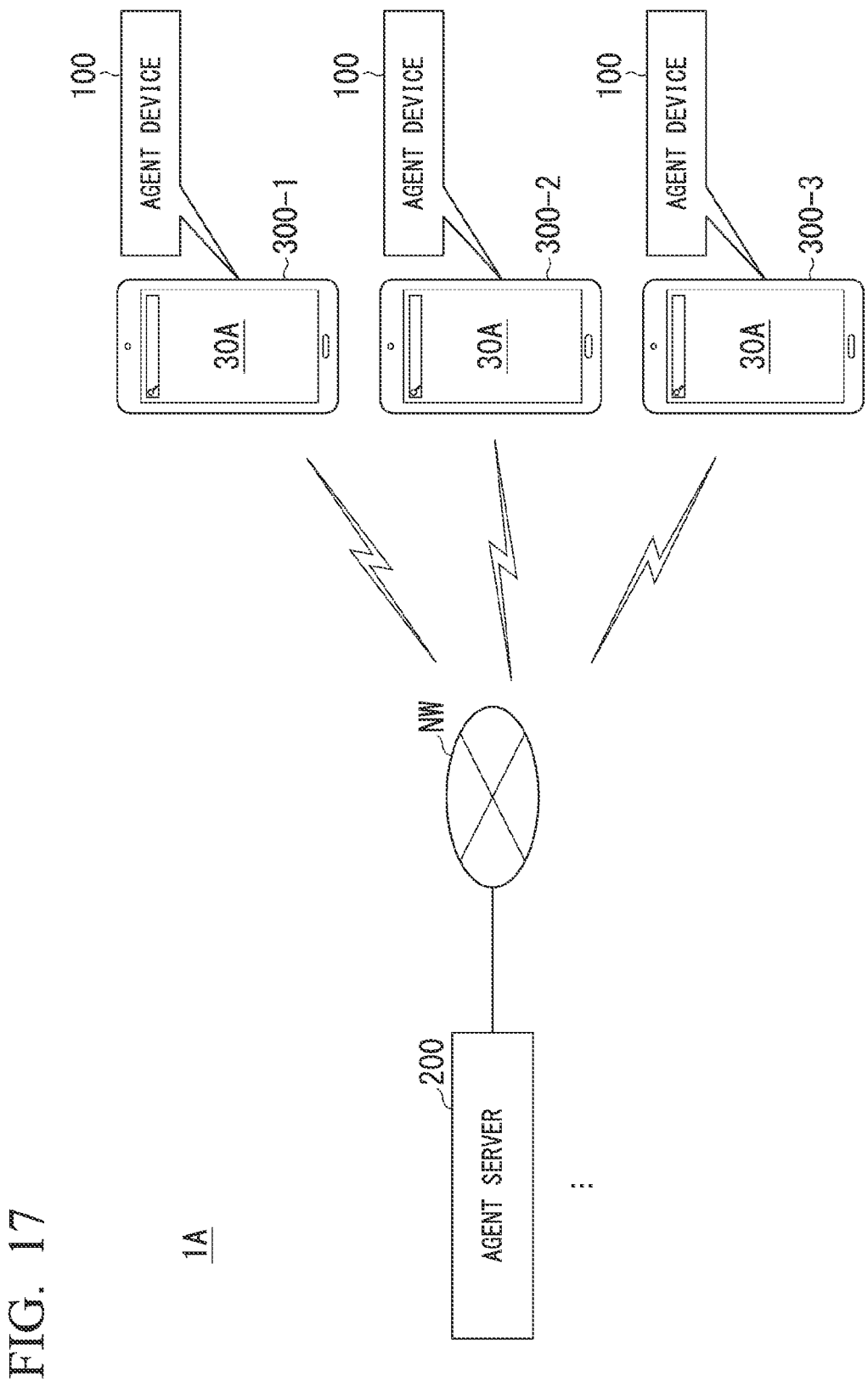
FIG. 17 is a diagram showing an example of a configuration of an information providing system of a second embodiment.

FIG. 17 is a diagram showing an example of a configuration of an information providing system 1A of the second embodiment. The information providing system 1A includes, for example, the agent server 200 and one or more terminal devices 300 (terminal devices 300-1 to 300-3 in the drawing).

The determiner 234 sets, as processing targets, a plurality of users who are in a relationship in which they are accompanying each other or a plurality of users who are at different points but are in a relationship in which they have promised to meet in the future. For example, on the basis of information provided in advance by the terminal devices 300 of users, the determiner 234 determines a plurality of users who are in a relationship in which they a common destination has been determined. The information provided by the terminal devices 300 is identification information of the terminal devices 300 of the plurality of users who are in a relationship in which they a common destination has been determined, which is provided by a predetermined terminal device 300, and information indicating a relationship in which they a common destination has been determined with other terminal devices 300, which is provided by each terminal device 300 (for example, information indicating a group that performs chatting). In the second embodiment, the terminal devices 300 may be present in a vehicle interior, and may be separately present at positions different from the vehicle interior.

The terminal device 300 is, for example, a terminal device, such as a smart phone, which can be carried by a user. The terminal device 300 has, for example, a functional configuration equivalent to the function implemented by the agent device 100. The functional configuration is implemented, for example, by a hardware processor, such as a CPU mounted on the terminal device 300, which executes an application program (software) stored in the storage device. The terminal device 300 includes a display device and an output device 30A such as a speaker. The terminal device 300 has a function of chatting with another terminal device 300. In this chat, on the basis of the content of a user's chat (conversation), the agent server 200 recommends a specific point or provides a user with information on the specific point.

Figure 18:
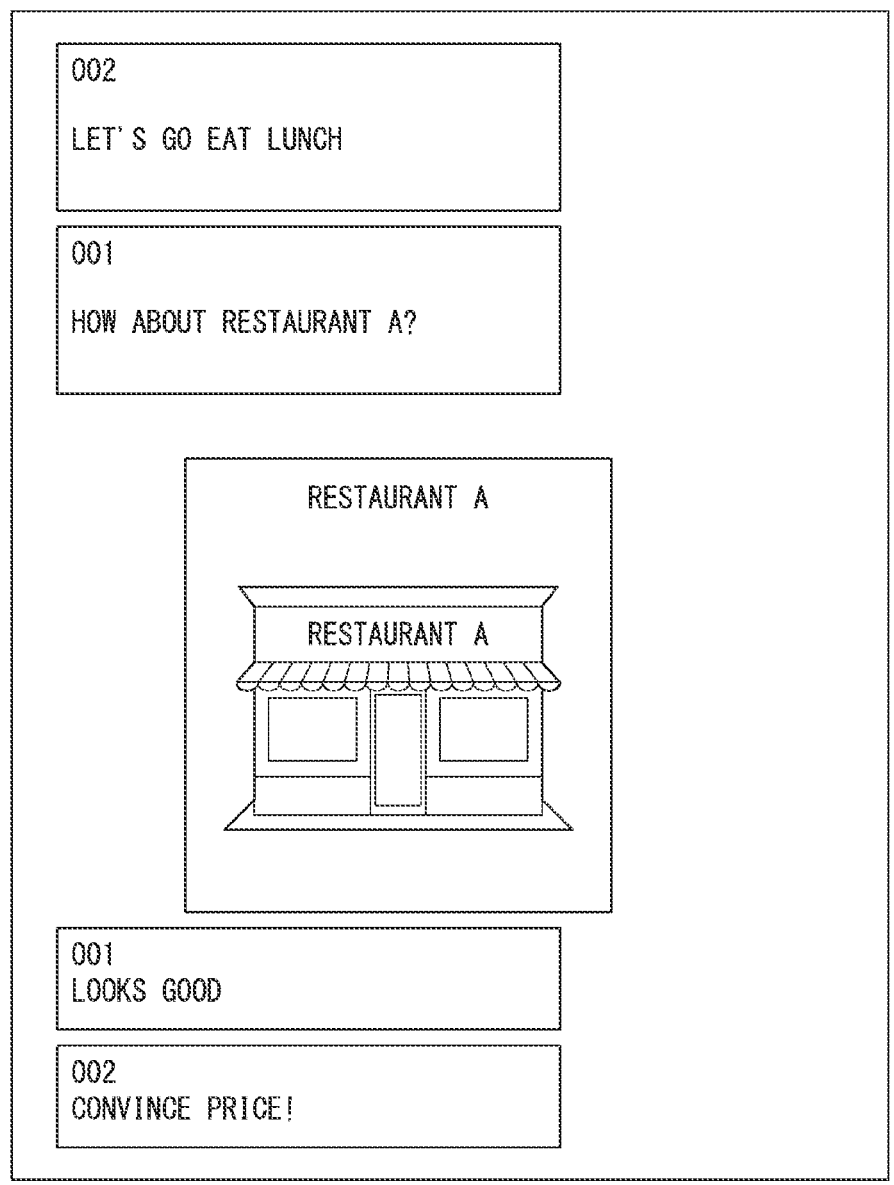
FIG. 18 is a diagram showing an example of an image displayed on an output device of a terminal device.

FIG. 18 is a diagram showing an example of an image IM3 displayed on the output device 30 of the terminal device 300. The image IM3 is an image output to the output device 30 when the terminal device 300 (user 001) is chatting with another terminal device 300 (user 002). The image IM3 includes, for example, information indicating the atmosphere of the restaurant A, as the information on the specific point. The atmosphere is item information on which the user 001 places importance.

According to the second embodiment described above, the same effects as those of the first embodiment are obtained. For example, when determining a dinning place while a plurality of users are heading to a meeting place, the information processor 230 can provide each user with item information on the basis of the orientation of each user or a predetermined user, so that user's convenience is improved.

Although a mode for carrying out the present invention has been described using the embodiments, the present invention is not limited to such embodiments and various modifications and replacements can be made without departing from the scope of the present invention.

What is claimed is:

1. An information providing device comprising:
an acquirer configured to acquire pieces of orientation information indicating orientations of users, comprising a first user and a second user, wherein the orientations comprise a first orientation associated with the first user and a second orientation associated with the second user;
a determiner configured to determine priority item information, which is item information to be preferentially provided, based on reference information in which a specific point and item information for each item of the specific point are associated with each other, and the pieces of orientation information acquired by the acquirer, wherein the specific point is located outside of a vehicle in which the users are occupants, and wherein the priority item information comprises first priority item information associated with the first orientation associated with the first user and second priority item information associated with the second orientation associated with the second user; and a provider configured to allow information output devices associated with at least a part of the users to output the priority item information, wherein the information output devices comprise a first information output device associated with the first user and a second information output device associated with the second user, and wherein the provider is configured to allow the first information output device to output the first priority item information and the second priority item information, and the second information output device to output the first priority item information and the second priority item information.

2. The information providing device according to claim 1, wherein, when the determiner determines the first priority item information on the specific point based on first orientation information acquired by the acquirer and indicating the first orientation of the first user and determines the second priority item information on the specific point based on second orientation information acquired by the acquirer and indicating the second orientation of the second user, the provider is configured to allow the first information output device associated with the first user to output the first priority item information and the second priority item information, and allow an information output device associated with the second user to output the first priority item information and the second priority item information.

3. The information providing device according to claim 2, wherein the determiner is configured to determine a plurality of users, who are in a relationship in which a common destination has been determined, as the first user and the second user.

4. The information providing device according to claim 1, wherein the acquirer is configured to acquire an evaluation of a predetermined user for the priority item information, and
the provider is configured to provide the evaluation of the predetermined user to a user different from the user who has performed the evaluation, wherein the user is one of the first user or the second user, and wherein the predetermined user is another one of the first user or the second user.

5. The information providing device according to claim 4, wherein the user and the predetermined user are occupants of the vehicle, and the predetermined user is a driver of the vehicle.

6. The information providing device according to claim 1, wherein the determiner is configured to switch between a first mode and a second mode based on an instruction of the first user to determine the priority item information,
the first mode is a mode in which the priority item information to be preferentially provided to a third user and a fourth user is determined based on orientation information acquired by the acquirer and indicating a third orientation of the third user, and
the second mode is a mode in which the priority item information to be preferentially provided to the third user is determined based on the orientation information acquired by the acquirer and indicating the third orientation of the third user, and the priority item information to be preferentially provided to the fourth user is determined based on orientation information acquired by the acquirer and indicating a fourth orientation of the fourth user.

7. The information providing device according to claim 1, wherein the determiner is configured to determine the priority item information to be preferentially provided to the first user, based on at least a portion of the pieces of the orientation information acquired by the acquirer and indicating orientations of the users and a priority set for each user of the users.

8. The information providing device according to claim 1, wherein the acquirer is configured to acquire at least a portion of the pieces of the orientation information according to position information indicating a position of the first user, and
the determiner is configured to determine the priority item information to be preferentially provided to the users, based on the reference information and the orientation information acquired by the acquirer.

9. The information providing device according to claim 1, wherein the acquirer is configured to acquire at least a portion of the pieces of the orientation information according to transportation means information indicating a transportation means of the first user, and
the determiner is configured to determine the priority item information to be preferentially provided to the users, based on the reference information and the orientation information acquired by the acquirer.

10. An information providing method causing a computer to perform the steps of:
acquiring pieces of orientation information indicating orientations of users, comprising a first user and a second user, wherein the orientations comprise a first orientation associated with the first user and a second orientation associated with the second user;
determining priority item information, which is item information to be preferentially provided, based on reference information in which a specific point and item information for each item of the specific point are associated with each other, and the pieces of orientation information acquired by the acquirer, wherein the specific point is located outside of a vehicle in which the users are occupants, and wherein the priority item information comprises first priority item information associated with the first orientation associated with the first user and second priority item information associated with the second orientation associated with the second user; and
allowing information output devices associated with at least a part of the users to output the priority item information, wherein the information output devices comprise a first information output device associated with the first user and a second information output device associated with the second user, and wherein the allowing comprises allowing the first information output device to output the first priority item information and the second priority item information, and allowing the second information output device to output the first priority item information and the second priority item information.

11. A non-transitory computer-readable storage medium that stores a computer program to be executed by a computer to perform at least:
a process of acquiring pieces of orientation information indicating orientations of users, comprising a first user and a second user, wherein the orientations comprise a first orientation associated with the first user and a second orientation associated with the second user;
a process of determining priority item information, which is item information to be preferentially provided, based on reference information in which a specific point and item information for each item of the specific point are associated with each other, and the pieces of orientation information acquired by the acquirer, wherein the specific point is located outside of a vehicle in which the users are occupants, and wherein the priority item information comprises first priority item information associated with the first orientation associated with the first user and second priority item information associated with the second orientation associated with the second user; and a process of allowing information output devices associated with at least a part of the users to output the priority item information, wherein the information output devices comprise a first information output device associated with the first user and a second information output device associated with the second user, and wherein the allowing comprises allowing the first information output device to output the first priority item information and the second priority item information, and allowing the second information output device to output the first priority item information and the second priority item information.

\* \* \* \* \*